United States Patent [19]

Conibear

[11] 4,127,960
[45] Dec. 5, 1978

[54] TRIGGER FOR ROTATING FRAME TRAPS

[75] Inventor: Frank Conibear, Victoria, Canada

[73] Assignee: Woodstream Corporation, Lititz, Pa.

[21] Appl. No.: 764,271

[22] Filed: Jan. 31, 1977

[30] Foreign Application Priority Data

Dec. 7, 1976 [CA] Canada .................................. 267335

[51] Int. Cl.² .......................................... A01M 23/26
[52] U.S. Cl. ..................................................... 43/92
[58] Field of Search ................................ 43/88, 90–97

[56] References Cited

U.S. PATENT DOCUMENTS

| 1,149,190 | 8/1915 | Ellison | 43/88 |
| 1,676,427 | 7/1928 | Dahl | 43/88 |
| 2,216,918 | 10/1940 | Lehn | 43/90 |
| 2,562,417 | 7/1951 | DeVorsey | 43/92 X |
| 3,973,352 | 8/1976 | Souza | 43/92 |

Primary Examiner—N. P. Godici
Attorney, Agent, or Firm—Holman & Stern

[57] ABSTRACT

An animal trap having two similar frames each having jaw forming sides that lie in a common plane and ends extending therebetween to support the jaws. The ends have a central portion in which the frames are pivotally connected through adjacent ends for rotation about a common axis between set and closed positions. Outer portions on each side of the central portion extend to the jaws. At least one actuator is capable of rapidly and forcefully effecting the rotation. The actuator has two arms spring-biased at one end so that the other ends, which terminate in rings encircling adjacent ends of both frames on opposite sides of said axis, would, if unobstructed, move apart to a distance substantially greater than the length of the frame ends. A trigger means releasably maintains the trap in the set position. The trigger means comprises a pivotally mounted treadle extending between the frames of the trap. Engagement means are associated with the treadle. A lever extends, when the trap is in the set position, from engagement with the engagement means to engage both frames of the trap to retain them in set position. Engagement with one frame is by a pivotal link whereby movement of the treadle releases the engagement of the lever with the engagement means to release the trap from the set position. The trap has no immediately visible obstruction when in the set position and the trigger displays good sensitivity.

19 Claims, 10 Drawing Figures

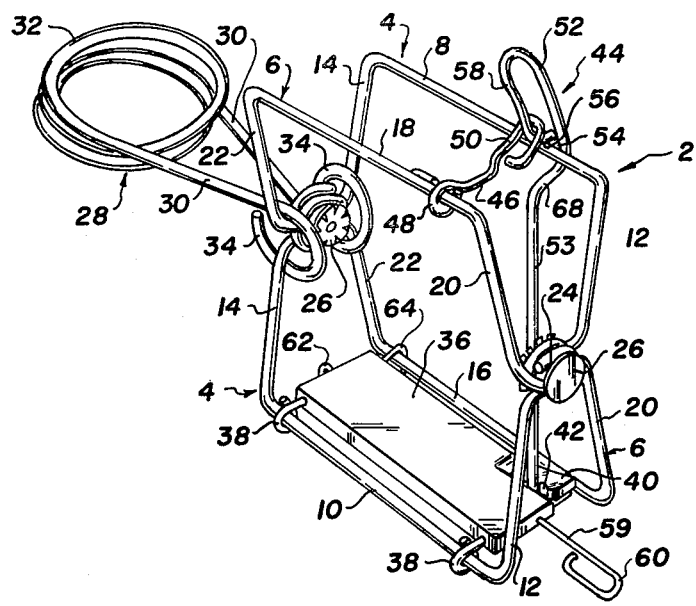

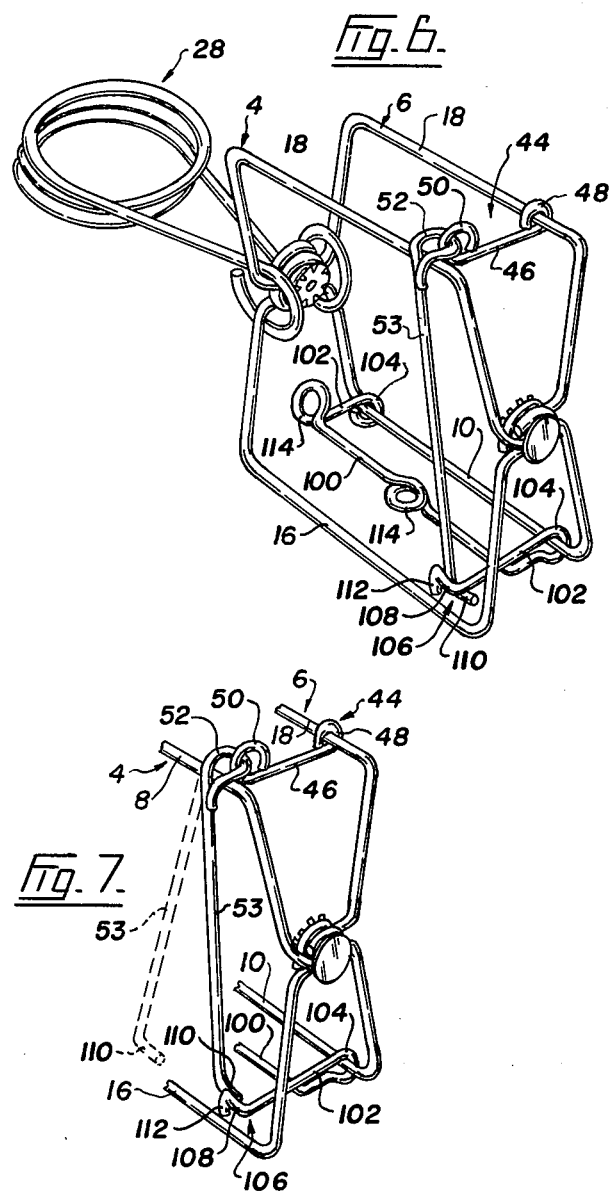

U.S. Patent  Dec. 5, 1978  Sheet 3 of 3  4,127,960
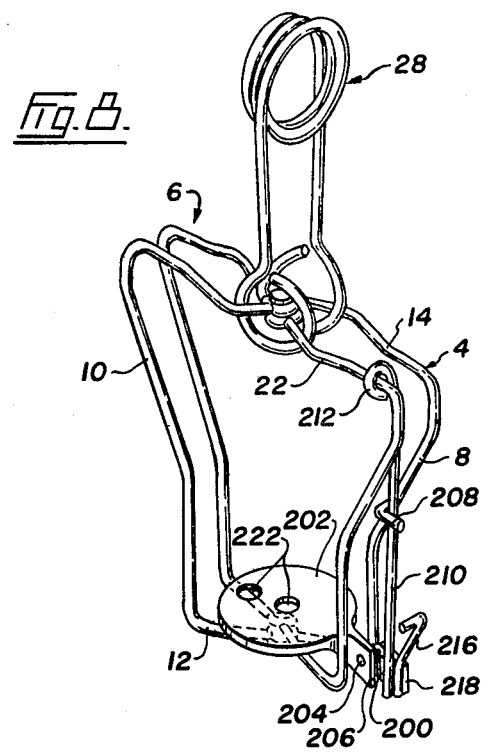
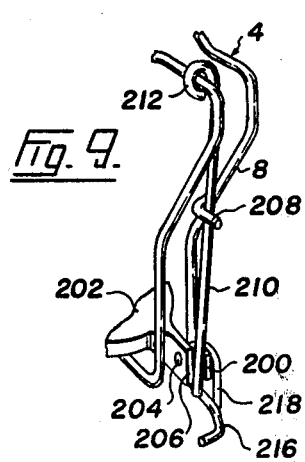
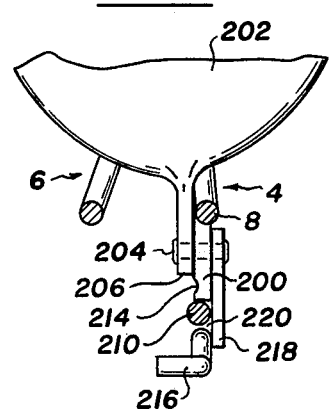

TRIGGER FOR ROTATING FRAME TRAPS

FIELD OF INVENTION

This invention relates to a trigger for release mechanisms for rotating frame traps. More particularly, the invention relates to a trigger that incorporates a treadle or foot plate and to the trap incorporating such a trigger.

DESCRIPTION OF PRIOR ART

Perhaps the most common triggers used to actuate release mechanisms for rotating frame traps—for example, as described in my U.S. Pat. No. 3,010,245 issued on Nov. 28, 1961—have consisted of prongs positioned so that when the trap is set the prongs project inwardly to lie approximately in a plane between the open jaws of the trap. My above United States Patent shows a single prong but double prongs have been used and are illustrated in the patent literature, for example, Lehn's U.S. Pat. No. 2,947,107 and Hofmeister's U.S. Pat. No. 3,421,251. The double prongs project inwardly to lie approximately in the plane between the open jaws of the set trap, as in the single pronged trigger. When an animal attempts to pass through the open frames of the set trap, it brushes the prong trigger thereby activating the release mechanism and enabling the trap to close under the influence of the actuator.

There have been a number of problems with the prong trigger. First, the prong or prongs are readily visible to an animal which is therefore discouraged from passing through the trap. All animals are cautious of proceeding through any position that may cause damage to their fur. This caution appears to be particularly pronounced in animals whose fur is valuable. There is, of course, also the point that animals dislike making any noise that would warn enemies of their presence. Such a noise could result from their fur brushing across the trigger.

Of more practical interest to a trapper is the point that the prong trigger can be avoided by an animal. Mink, for example, are very cunning and agile animals and have been known to pass through a trap unharmed simply by avoiding the prong trigger.

Foot plate triggers have been known for many years. They have been used in rotating frame traps, for example, such a trigger is described in my U.S. Pat. No. 3,762,094 issued on Oct. 2, 1973. Furthermore, foot triggers are probably the most common triggers used with leg-hold traps. However, a disadvantage that is present in the foot trigger has been its lack of sensitivity. A clear advantage of the trigger is that it leaves unobstructed the frames of the trap. That is, the animal does not see any obstruction, for example a prong, in the frame that would arouse its natural caution. Thus, at least in theory, the foot plate trigger offers an ideal solution to the problem of the caution of the animal. But it presents the problem of lack of sensitivity.

SUMMARY OF THE INVENTION

It is believed that the present invention overcomes these disadvantages. In its broadest aspect, the invention is an animal trap having two similar frames each having jaw forming sides that lie in a common plane and ends extending therebetween to support said jaws, said ends having a central portion in which the frames are pivotally connected through adjacent ends for rotation about a common axis between set and closed positions and outer portions on each side of the central portion extending to said jaws, at least one actuator, capable of rapidly and forcefully effecting such rotation, which has two arms spring-biased at one end so that the other ends, which terminate in rings encircling adjacent ends of both frames on opposite sides of said axis, would, if unobstructed, move apart to a distance substantially greater than the length of said frame ends, and a trigger means for releasably maintaining the trap in set position, said trigger means comprising a pivotally mounted treadle extending between the frames of the trap; engagement means associated with the treadle; a lever extending, when the trap is in the set position, from engagement with said engagement means to engage both frames of the trap to retain them in set position, engagement with one frame being by a pivotal link whereby movement of the treadle releases the engagement of the lever with the engagement means to release the trap from the set position.

In a preferred embodiment the animal trap has first and second similar frames each frame having first and second jaw forming sides which lie on a common plane and first and second ends extending therebetween to support the jaws. The treadle is mounted on a first side of the first frame to extend, when the trap is in the set position, between said first side of the first frame and the adjacent first side of the second frame and is movable between a set position and a release position. There are engagement means on the treadle and the lever is pivotally mounted on the second side of the second frame and extends to engage the first frame and, when the trap is in the set position, the engagement means of the treadle whereby movement of the treadle releases the engagement of the lever with engagement means to release the trap.

In one embodiment of the invention the treadle is a foot plate pivotally mounted on the first side of the first frame.

It is desirable in this preferred embodiment that the lever be formed of first and second parts pivotally connected adjacent and above the second end of the second frame. The pivotal connection between the first and second parts of the lever may comprise two engaged eyes, one on each end of the first and second parts, the first part of the lever extending substantially perpendicularly from the engagement means when the trap is in the set position, and the loop on said first part being above the second side of the second frame, elongated and one surface at least of the loop being curved to define substantially an arc of a circle centered on the second side of the second frame, whereby movement of the loop of the second part upwardly in the loop of the first part increases the load required to release the trap.

In a further embodiment the trap has first and second similar frames, each having first and second jaw forming sides while lie on a common plane and first and second ends extending therebetween to support the jaws and the treadle is a first lever disposed between the first and second frames; limbs extending from the first lever to pivotally attach the first lever to the first side of the first frame; a catch member extending, when the trap is in the set position, from the first lever towards the first side of the second frame; a second lever extending upwardly, when the trap is in the set position, from engagement with the catch member to engage said second frame and pivotally engage said first frame at a point remote from the pivotal mounting of the first lever whereby movement of the first lever releases engagement of the first lever with the catch member to release the trap.

In a further embodiment the animal trap comprises first and second similar frames, each frame having first and second jaw forming sides which lie on a common plane and first and second ends extending therebetween to support the jaws. There is a lug formed on one jaw of the first frame of the trap. A recess is formed on the lug remote from the jaw. A foot plate is pivotally attached to the lug and extends between the frames. A contact surface on one end of the foot plate is adjacent the recess and there is a catch formed on the said one jaw. A lever is pivotally mounted on a side of the second frame and extends downwardly when the trap is in the set position to engage the catch and the recess. Movement of the foot plate about its pivotal mounts moves the contact surface to move the lever from engagement with the recess and thus releases the trap.

The last embodiment is of a particular application with traps having trapezoidal frames as described and claimed in my U.S. Pat. No. 3,760,531, issued Sept. 25, 1973.

BRIEF DESCRIPTION OF DRAWINGS

The invention is illustrated, merely by way of example, in the accompanying drawings in which:

FIG. 1 is a general, perspective view of a trap according to the present invention;

FIG. 2 is a partial plan view of the trap of FIG. 1; and

FIGS. 3 to 5 are details of the trap of FIG. 1.

FIG. 6 illustrates a further embodiment of the invention;

FIG. 7 is a detail of the trap of FIG. 6;

FIG. 8 is a further embodiment of the invention;

FIGS. 9 and 10 are details of the trap of FIG. 8.

DESCRIPTION OF PREFERRED EMBODIMENT

Referring to FIGS. 1 to 5, they show a trap 2 having a first frame 4 and a second similar frame 6. The first frame 4 has a first, jaw-forming side 8 and a second jaw-forming side 10. First frame 4 is also made up of first ends 12 and 14 extending between the jaw-forming sides 8 and 10 of the first frame 4.

In similar fashion the second frame 6 is made up of a first jaw-forming side 16 and a second jaw-forming side 18. Jaw-forming sides 16 and 18 of the second frame 6 are also connected by a first end 20 and a second end 22. The ends 12, 14, 20 and 22 are each formed with a substantially central opening 24 to enable pivotal connection of the first frame 4 and the second frame 6 through pivot pins 26. The trap is provided with an actuator 28 comprising two arms 30 spring biased by a coil spring 32 at one end. The outer ends of arms 30 each terminate in loops 34 which encircle adjacent ends 12, 14, 20 and 22 of the frames 4 and 6. The actuator 32 is such that the rings 34 would, if unobstructed by the frames 4 and 6 move apart a distance substantially greater than the length of the frame ends 12, 14, 20 and 22. It will be appreciated by a man skilled in the art that all that has been described above is conventional for rotating frame traps. The present invention resides in the trigger means which releasably maintain the trap in the set position—the position in which it is shown in FIG. 1. Release of the trigger causes rapid closing of the trap by rotation of the first frame 4 and the second frame 2 about the pivot pins 26 under the influence of the actuator 28.

In FIGS. 1 to 5, the trigger includes a foot plate 36 mounted on the second side 10 of the first frame 4 and extending, when the trap is in the set position shown in FIG. 1, towards the adjacent first side 16 of the second frame 6. As shown in the drawings the foot plate 36 is pivotally mounted on the second side 10 of the first frame 4 by the provision of loops 38 attached to the foot plate 36.

Foot plate 36 is provided with engagement means in the form of a ramp 40. In the illustrated embodiments, particularly as illustrated in FIG. 2, ramp 40 is formed with three recesses 42. Recesses 42 engage with a lever means 44 when the trap is in the set position as illustrated. In the illustrated, preferred embodiment, lever means 44 is formed in two parts. A first part 46 which is pivotally mounted by a loop 48 on the second side 18 of the second frame 6. First part 46 of the lever means 44 extends towards the first side 8 of the first frame 4. At its end remote from the loop 48 it is provided with a second loop 50. Second loop 50 is engaged with an elongated loop 52 attached to an end of a second part 53 of the lever means 44 remote from the ramp 40. Below the elongated loop 52 second part 53 of lever means 44 is formed with a recess 54 whose lower surface 56 extends from the top of second part 53 to contact the first side 8 of the first frame 4. Thus, it can be noted on FIG. 1 that in the illustrated embodiment the lever means 44 is made of two parts, 46 and 53, each provided with loops that permit a pivotal connection of the parts 46 and 53 adjacent and above the first side 8 of the first frame 4. Lever means 44 thus extends from its pivotal mounting by loop 48 on the second jaw-forming side 18 of the second frame 6 over and around the first side 8 of the first frame 4 and downwardly to engage, when the trap is in the set position as shown in FIG. 1, with a recess 42 on the ramp 40 of the foot plate 36. In this position the lever means 44 prevents the sides 8 and 18 of the respective frames from being moved apart under the influence of the actuator 28.

It can be noted, particularly from FIG. 3, that the loop 52 is formed with one surface 58 that is substantially an arc of a circle centered on the second side 18 of the second frame 6.

As illustrated perhaps most clearly in FIGS. 2 to 5 the trap is provided with a safety catch. The safety catch comprises an elongated rod 59 extending through the foot plate 36. At one end, rod 59 is formed with a handle 60. At its other end it is formed with a plate contacting member 62 provided with a hook member 64 to engage on the first side 16 of the second frame 6.

The trap of FIGS. 1 to 5 operates as follows:

The trap 2 is set by compressing the arms 30 of the actuator 28 and moving the sides 8 or 10 or 16 or 18 towards one another in well-known manner. It is also ensured that the parts 46 and 53 of the lever means 44 are in approximately the correct position to fit over the first side 8 of the first frame 4 and that the foot plate 36 is in the proper position. When the trap is sufficiently compressed, the free end of lever means 44 is placed in required recess 42 on the ramp 40.

The safety catch is moved by pulling on it as illustrated in FIG. 2. In that Figure, the dotted outline shows the unsafe position—that is the position at which the trap can be actuated by simple pressure applied to the foot plate 36. In the solid position the plate contacting member 62 lies underneath the foot plate 36 to prevent its being moved downwardly. This action is facilitated by the gripping of the hook member 64 on the first side 16 of the second frame 6.

At the desired location, for example in a known animal run, the trap is set by pushing on handle 60 to release the safety catch, that is to move the plate contacting member 62 to the dotted position shown in FIG. 2.

Loop 48 also serves to locate the lever means 44. It cannot move a substantial distance along the second side 18 of the second frame 6 because of the presence of abutment 66 attached to the side 18—see FIG. 1. Similarly the lever means 44 is prevented from moving beyond the second ends 12 or 14 because the lower part 68 of recess 54 curves inwardly to meet second part 53 of lever means 44 and is within the trap as shown in FIG. 3.

The trap is released by weight being applied to the foot plate 36. As the foot plate 36 is moved downwardly engagement between the lever means 44 and the selected recess 42 on the ramp 40 ceases. Under the influence of the coil spring 32 the actuator arm 30 vigorously rotates the frames 4 and 6 on pivot pins 26 to trap the animal that has applied weight to the foot plate 36. The animal is trapped between the second side 18 of second frame 6, and the second side 10 of the first frame 4 at one end and, at its other end, between the first side 8 of the first frame 4 and the first side 16 of the second frame 6. This release of the trap with downward movement of the foot plate 36 is illustrated in FIG. 4. The solid line position for the plate 36 is the set position; the lined outline shows the position immediately after release of the lever means 44 from a recess 42 on the ramp 40.

It should be noted that the lever means 44 is retained in contact with the recess 42 once the trap is set by the tension placed on the trap by the actuator 28 and, in particular, by the coil spring 32 of the actuator 28.

FIGS. 6 and 7 illustrates an embodiment of the invention in which the treadle is a first lever 100 disposed between the first frame 4 and the second frame 6. Where common parts are used for the embodiment shown in FIGS. 1 to 5 and FIGS. 6 and 7 the same reference numerals are used.

There are limbs 102 extending from each end of the first lever 100 to pivotally attach the first lever 100 to the second jaw forming side 10 of the first frame 4. Limbs 102 end in loops 104 that ensure the necessary pivotal connection to second side 10. A catch member 106 extends from first lever 100 towards the first side 16 of the second frame 6. Catch member 106 is formed with a limb 108 at the end remote from the first lever 100. Limb 108 engages with a limb 110 formed on the end of the second part 53 of lever means 44. As in the embodiment of FIGS. 1 to 5, second part 53 of lever means 44 extends upwardly when the trap is in the set position as illustrated in FIG. 6. Similarily, as in the embodiment of FIGS. 1 to 6, second part 53 of lever means 44 is provided with a loop equivalent to loop 52 shown in FIG. 1 but not elongated. It will be appreciated that loop 52 can be elongated for the same reason as loop 52 in FIG. 1 is shown elongated. Limb 108 on catch 106 is formed with a downwardly projecting limb 112 that, when the trap is in the set position indicated in solid line in FIG. 7, provides the means for setting the trap.

Limb 108 is, in effect merely a safety device and the trap is shown in the safe position in FIG. 6. At that position it is relatively difficult to release the trap inadvertently because of the interengagement of limb 110, 108 and catch member 106. To this end limb 108 can be formed in a U-shape to facilitate engagement of the second part 53 of the lever means 44 with the limb 108. To set the trap the second part 53 of the lever means 44 is moved so that the limb 110 on second part 53 engages limb 112 formed on limb 108 of the catch member 106. It will be immediately apparent from FIG. 7 that the downward movement of treadle 100 will cause corresponding movement of limb 112 which will thus move out of engagement with limb 110 on the second part 53 of lever means 44. As a result the second part 53 moves to the position shown in broken lines in FIG. 7, that is the trap is released.

The treadle illustrated in FIG. 6, is formed with loops 114 which are simply a means of locating bait in the trap.

The embodiment of FIGS. 6 and 7 can incorporate the elongated loop 52 instead of the circular loop 52 as shown in FIG. 6. Similarly variation of the sensitivity of the trap can be obtained by varying the length of limb 112. It should be noted that the trap can be released by upward or downward movement of the first lever 100.

Limb 110 must be about the same length as limb 108 or shorter. Otherwise, the trap may not consistently release with downward movement of the lever 100 as limb 110 may simply engage underneath the catch member 106 when the trap is released. However, a modification of the trap can dispense with the limb 110 and with the limb 112. The trap would then be retained in the set position simply by frictional engagement of the second part 53 of lever means 44 with the limb 108. However, a disadvantage of this variation is that it is only effective with downward movement of the first lever 100.

The lever 100, limbs 102, loops 104 and 114 and catch member 106 are shown formed from one piece of wire in the embodiment of FIG. 6. Clearly however, this combination of parts can be formed from separate pieces welded or similarly joined together. Limbs 102 can pivot on first side 16 of the second frame 6, that is the arrangement shown in FIG. 6 can be reversed so that the second part 53 of lever means 44 is on the other side of the trap from that shown in FIGS. 6 and 7.

The embodiment of FIGS. 8 to 10 is of particular application where the first frame 4 and the second frames 6 are trapezoidal in section as claimed in my U.S. Pat. No. 3,760,531 issued Sept. 25, 1973. In the trap of FIGS. 8 to 10 there is a lug 200 formed on the first jaw forming side 8 of the first frame 4. Lug 200 may be attached to side 8 by, for example, welding. A foot plate 202 is pivotally attached to the lug 200 by rivot. Foot plate 202 terminates at one end in a contact surface 206. There is a catch 208 formed on the first side 8 of the first frame 4. A lever 210 is pivotally mounted by loop 212 to the second end 22 of the second frame 6. Lever 210 extends downwardly from loop 212 when the trap is in the set position, to engage a recess 214 formed in the lug 200. This set position is illustrated in FIG. 9. The illustrated trap is formed with a safety bar 216 that is attached, for example, by welding, to a plate 218 that also pivots on rivet 204. Saftey bar 216 is positioned at the end of the plate 208 in order to define a recess 200 between the contact surface 206 of the foot plate 202 and the safety bar 216.

When the trap is in the set position, as illustrated in FIG. 9, movement of the foot plate 202 downwardly causes the contact surface 206 to incline and to push the lever 210 from engagement with the recess 214 in the lug 200. As a result the trap is released.

The safety bar 216 acts as illustrated in FIG. 10. Lever 210 is moved to engage recess 220. It can not be moved outwardly from that position inadvertently and thus the trap cannot be released inadvertently. Before the trap is set it is necessary that the safety bar 216 be moved downwardly to the position illustrated in FIG. 9 from the position illustrated in FIGS. 8 and 10.

Foot plate 202 is desirably provided with means to attach bait, for example holes 222.

A number of aspects of the present invention are illustrated only in certain of the drawings. However, generally speaking, all aspects of the invention illustrated with regards to one embodiment can also be used in the other two embodiments.

The traps of the present invention have the advantages of a foot traps but with excellent sensitivity. In the embodiment illustrated in FIGS. 1 to 5, it is possible to vary the sensitivity of the trap. The sensitivity of the trap increases with decreasing vertical height of the recess 42 on the ramp 40. Thus, if the notch 42 on the left of FIG. 2 is engaged the sensitivity of the trap is high, that is the trap can easily be fired. In the middle position—in which lever means 44 is shown engaged in FIG. 2—the sensitivity is moderate. The sensitivity is reduced if the recess 42 on the right of the ramp 40 on the foot plate 36. The illustrated position for the rame 40, adjacent one corner of foot plate 36 is a preferred position.

In the embodiment of FIGS. 1 to 5 the tension on the lever means 44 can be varied by movement of the first part 46 of the lever means 44 as first part 46 is moved upwardly—towards the dotted position shown in FIG. 3—the tension is increased. That is the higher the position then the harder it is to push down the foot plate. This variation of sensitivity and tension can be varied for the particular animal it is wished to catch. For example, the trap can be set in such a way that it will not catch animals of a certain weight but only catch animals of a predetermined, required size.

The traps of the present invention may be made of the round steel bar of which rotating frame traps are usually made. The foot plate 36 may be made of a plastic material which facilitates the formation of, for example, a channel for the rod 58 of the safety catch. With a plastic foot plate 36 the loops 38 can be formed on stems which may be embedded in the plastic of the foot plate. With a plastic foot plate the ramp 40 can, of course, be molded integrally.

I claim:

1. An animal trap having first and second similar frames each frame having first and second jaw forming sides that lie in a common plane and ends extending therebetween to support said jaw forming sides, said ends having a central portion in which the frames are pivotally connected through adjacent ends for rotation about a common axis between set and closed positions and outer portions on each side of the central portion extending to said jaws, at least one actuator, capable of rapidly and forcefully effecting such rotation, which has two arms spring-biased at one end so that the other ends, which terminate in rings encircling adjacent ends of both frames on opposite sides of said axis, would,, if unobstructed, move apart to a distance substantially greater than the length of said frame ends, and a trigger means for releasably maintaining the trap in set position, said trigger means comprising a pivotally mounted treadle extending between the second jaw forming side of the first frame and the first jaw forming side of the second frame; engagement means on the treadle; a lever means connected by a pivotal link to the second jaw forming side of the second frame and extending, when the trap is in the set position from said pivotal link over and around the first jaw forming side of the first frame and terminating in a free end in engagement with said engagement means, said lever means in the set position of the trap preventing the second jaw forming side of the second frame and the first jaw forming side of the first frame from moving apart under the influence of said actuator and the treadle in the set position being pivotally movable to release said free end of said lever means from said engagement means to release the trap from the set position.

2. A trap claimed in claim 1 in which the treadle is pivotally mounted on the second jaw forming side of the first frame.

3. A trap as claimed in claim 1 in which the treadle is a foot plate pivotally mounted on the second jaw forming side of the first frame.

4. A trap as claimed in claim 1 in which the engagement means is an upstanding abutment adjacent one corner of the foot plate.

5. A trap as claimed in claim 4 including a plurality of engagement means on the foot plate, each of a depth different from the others so that the sensitivity of release of the trap can be varied.

6. A trap as claimed in claim 1 in which the lever means is formed of first and second parts pivotally connected adjacent and above the first jaw forming side of the first frame.

7. A trap as claimed in claim 6 in which the first part of the lever means extends substantially perpendicularly upwardly from the engagement means and the lever means is formed with a recess whose lower surface extends from the top of the vertical portion outwardly to contact the first jaw forming side of the first frame, the arrangement being such as to prevent movement of the trigger beyond one end of the first frame and consequent inadvertent release of the trigger.

8. A trap as claimed in claim 1 including abutment means formed on the second jaw forming side of the second frame to restrict movement of the lever along the frame.

9. A trap as claimed in claim 6 in which the first and second parts of the lever means comprises two engaged loops, one on each end of the first and second parts respectively, the first part of the lever means extending substantially perpendicularly from the engagement means, when the trap is in the set position, and the loop on said first part being above the first jaw forming side of the first frame, said loop being elongated and having one surface curved to define substantially an arc of a circle centered on the second jaw forming side of the second frame, whereby movement of the loop of the second part upwardly in the loop of the first part increases the load required to release the trap.

10. A trap as claimed in claim 1 in which the treadle is a first lever disposed between the first and second frames; limbs extending from the first lever to pivotally attach the first lever to the second jaw forming side of the first frame; a catch member extending, when the trap is in the set position, from the first lever towards the first jaw forming side of the second frame; said free end of said lever means, when the trap is in the set position, being in engagement with the catch member whereby movement of the first lever releases engagement of the free end of the lever means with the catch member to release the trap.

11. A trap as claimed in claim 10 in which the first lever has bait attachment means.

12. A trap as claimed in claim 10 in which the lever means is formed of first and second parts pivotally connected adjacent and above the first jaw forming side of the first frame.

13. A trap as claimed in claim 10 in which the catch member terminates in an inverted L, one of whose limbs is engaged by said free end of the lever means.

14. A trap as claimed in claim 13 in which said free end of said lever means is formed with a limb that engages, when the trap is in a safe position, under the catch member of the first lever.

15. An animal trap having first and second similar frames each having jaw forming sides that lie in a common plane and ends extending therebetween to support said jaw forming sides, said ends having a central portion in which the frames are pivotally connected through adjacent ends for rotation about a common axis between set and closed positions and outer portions on each side of the central portion extending to said jaws, at least one actuator, capable of rapidly and forcefully effecting such rotation, which has two arms spring-biased at one end so that the other ends, which terminate in rings encircling adjacent ends of both frames on opposite sides of said axis, would, if unobstructed, move apart to a distance substantially greater than the length of said frame ends, and a trigger means for releasably maintaining the trap in set position, said trigger means comprising a lug formed on one jaw forming side of the first frame of the trap; a foot plate pivotally attached to the lug and extending between the frames; a contact surface on an end of the foot plate; a catch formed on said one jaw forming side; a lever pivotally mounted on a side of the second frame and extending, when the trap is in the set position, to engage the catch and the lug adjacent the contact surface of the foot plate end, whereby movement of the foot plate about its pivotal mount moves the contact surface to force the lever from engagement with the lug and thus releasing the trap.

16. A trap as claimed in claim 15 including a safety bar pivotally mounted on said lug to prevent, when the trap is in the safe position, movement of the lever away from the lug.

17. A trap as claimed in claim 15 in which the lug is formed with a shallow recess to receive the lever.

18. A trap as claimed in claim 16 in which the foot plate has bait attachment means.

19. A trap as claimed in claim 16 in which the frames are each generally trapezoidal in configuration.

* * * * *